(12) United States Patent
Liang

(10) Patent No.: US 9,257,695 B2
(45) Date of Patent: Feb. 9, 2016

(54) LOCALIZED HEAT TREATMENT OF BATTERY COMPONENT FILMS

(75) Inventor: Jiuh-Ming Liang, Hacienda Heights, CA (US)

(73) Assignee: FRONT EDGE TECHNOLOGY, INC., Baldwin Park, CA (US)

( * ) Notice: Subject to any disclaimer, the term of this patent is extended or adjusted under 35 U.S.C. 154(b) by 629 days.

(21) Appl. No.: 13/434,775

(22) Filed: Mar. 29, 2012

(65) Prior Publication Data

US 2013/0260230 A1 Oct. 3, 2013

(51) Int. Cl.
| | |
|---|---|
| H01M 4/04 | (2006.01) |
| H01M 4/131 | (2010.01) |
| H01M 4/134 | (2010.01) |
| H01M 4/1391 | (2010.01) |
| H01M 4/1395 | (2010.01) |
| H01M 4/38 | (2006.01) |
| H01M 4/485 | (2010.01) |
| H01M 4/505 | (2010.01) |
| H01M 4/525 | (2010.01) |
| H01M 4/66 | (2006.01) |
| H01M 10/04 | (2006.01) |
| H01M 10/052 | (2010.01) |
| H01M 10/0562 | (2010.01) |
| H01M 10/0585 | (2010.01) |

(52) U.S. Cl.
CPC .......... *H01M 4/0404* (2013.01); *H01M 4/0442* (2013.01); *H01M 4/0471* (2013.01); *H01M 4/131* (2013.01); *H01M 4/134* (2013.01); *H01M 4/1391* (2013.01); *H01M 4/1395* (2013.01); *H01M 4/38* (2013.01); *H01M 4/485* (2013.01); *H01M 4/505* (2013.01); *H01M 4/525* (2013.01); *H01M 4/661* (2013.01); *H01M 10/0436* (2013.01); *H01M 10/052* (2013.01); *H01M 10/0562* (2013.01); *H01M 10/0585* (2013.01); *Y02E 60/122* (2013.01); *Y10T 29/49108* (2015.01)

(58) Field of Classification Search
None
See application file for complete search history.

(56) References Cited

U.S. PATENT DOCUMENTS

| | | | |
|---|---|---|---|
| 3,375,135 | A | 3/1968 | Moulton et al. |
| 3,414,685 | A | 12/1968 | Geib et al. |
| 3,530,007 | A | 9/1970 | Golubovic |

(Continued)

FOREIGN PATENT DOCUMENTS

| | | |
|---|---|---|
| CN | 1661354 A | 8/2005 |
| CN | 1665354 | 8/2005 |

(Continued)

OTHER PUBLICATIONS

U.S. Appl. No. 12/894,571, Final Office Action Jul. 18, 2011.

(Continued)

*Primary Examiner* — Sarah A Slifka
(74) *Attorney, Agent, or Firm* — Ashok K. Janah; Janah & Associates, PC

(57) ABSTRACT

A battery fabrication method includes forming on a substrate, at least a portion of a battery cell having a plurality of battery component films that include an underlying film with an overlying metal-containing film. A beam incident area of the metal-containing film is locally heated by directing onto the metal-containing film, an energy beam maintained at a fluence of at least about 800 J/cm². The metal-containing film is heated to a temperature that is at least 100° C. higher than the temperature attained by the underlying film.

24 Claims, 6 Drawing Sheets

(56) References Cited

U.S. PATENT DOCUMENTS

| | | |
|---|---|---|
| 3,844,841 A | 10/1974 | Baker |
| 3,969,142 A | 7/1976 | Greatbatch et al. |
| 3,993,508 A | 11/1976 | Erlichman |
| 4,031,449 A | 6/1977 | Trombly |
| 4,119,769 A | 10/1978 | Schneider et al. |
| 4,233,371 A | 11/1980 | Dorrestijn |
| 4,309,494 A | 1/1982 | Stockel |
| 4,421,835 A | 12/1983 | Manassen et al. |
| 4,459,328 A | 7/1984 | Mizuhara |
| 4,543,441 A | 9/1985 | Kumada et al. |
| 4,565,753 A | 1/1986 | Goebel et al. |
| 4,597,844 A | 7/1986 | Hiraki et al. |
| 4,619,865 A | 10/1986 | Keem et al. |
| 4,663,183 A | 5/1987 | Ovshinsky et al. |
| 4,698,256 A | 10/1987 | Giglia et al. |
| 4,714,660 A | 12/1987 | Gates, Jr. |
| 4,725,345 A | 2/1988 | Sakamoto et al. |
| 4,777,090 A | 10/1988 | Ovshinsky et al. |
| 4,871,433 A | 10/1989 | Wagner et al. |
| 4,873,115 A | 10/1989 | Matsumura et al. |
| 4,877,677 A | 10/1989 | Hirochi et al. |
| 4,882,212 A | 11/1989 | SinghDeo et al. |
| 4,904,542 A | 2/1990 | Mroczkowski |
| 4,996,079 A | 2/1991 | Itoh |
| 5,019,467 A | 5/1991 | Fujiwara |
| 5,171,413 A | 12/1992 | Arntz et al. |
| 5,197,889 A | 3/1993 | Rizzo et al. |
| 5,240,794 A | 8/1993 | Thackeray et al. |
| 5,249,554 A | 10/1993 | Tamor et al. |
| 5,250,891 A | 10/1993 | Glasgow |
| 5,253,300 A | 10/1993 | Knapp |
| 5,254,415 A | 10/1993 | Williams et al. |
| 5,262,028 A | 11/1993 | Manley |
| 5,330,853 A | 7/1994 | Hofmann et al. |
| 5,338,625 A | 8/1994 | Bates et al. |
| 5,368,939 A | 11/1994 | Kawamura et al. |
| 5,445,906 A | 8/1995 | Hobson et al. |
| 5,490,911 A | 2/1996 | Makowiecki et al. |
| 5,498,490 A | 3/1996 | Brodd |
| 5,503,912 A | 4/1996 | Setoyama et al. |
| 5,506,858 A | 4/1996 | Takenaka et al. |
| 5,511,587 A | 4/1996 | Miya et al. |
| 5,512,147 A | 4/1996 | Bates et al. |
| 5,512,387 A | 4/1996 | Ovshinsky |
| 5,516,340 A | 5/1996 | Takeuchi et al. |
| 5,547,767 A | 8/1996 | Paidassi et al. |
| 5,552,242 A | 9/1996 | Ovshinsky et al. |
| 5,554,456 A | 9/1996 | Ovshinsky et al. |
| 5,561,004 A | 10/1996 | Bates et al. |
| 5,597,660 A | 1/1997 | Bates et al. |
| 5,607,789 A | 3/1997 | Treger et al. |
| 5,612,152 A | 3/1997 | Bates et al. |
| 5,629,560 A | 5/1997 | Katsui et al. |
| 5,650,243 A | 7/1997 | Ferment et al. |
| 5,656,364 A | 8/1997 | Rickerby et al. |
| 5,663,183 A | 9/1997 | Frost et al. |
| 5,670,252 A | 9/1997 | Makowiecki et al. |
| 5,670,272 A | 9/1997 | Cheu et al. |
| 5,681,666 A | 10/1997 | Treger et al. |
| 5,700,551 A | 12/1997 | Kukino et al. |
| 5,705,293 A | 1/1998 | Hobson |
| 5,705,297 A | 1/1998 | Warren |
| 5,708,297 A | 1/1998 | Clayton |
| 5,725,909 A | 3/1998 | Shaw et al. |
| 5,786,582 A | 7/1998 | Roustaei et al. |
| 5,814,195 A | 9/1998 | Lehan et al. |
| 5,818,199 A | 10/1998 | Beard |
| 5,824,374 A | 10/1998 | Bradley, Jr. et al. |
| 5,871,865 A | 2/1999 | Barker et al. |
| 5,894,656 A | 4/1999 | Menon et al. |
| 5,932,368 A | 8/1999 | Batawi et al. |
| 5,961,672 A | 10/1999 | Skotheim et al. |
| 5,981,102 A | 11/1999 | Grigg et al. |
| 5,985,485 A | 11/1999 | Ovshinsky et al. |
| 6,017,654 A | 1/2000 | Kumta et al. |
| 6,022,640 A | 2/2000 | Takada et al. |
| 6,039,850 A | 3/2000 | Schulz |
| 6,040,680 A | 3/2000 | Toya et al. |
| 6,046,575 A | 4/2000 | Demuro |
| 6,051,114 A | 4/2000 | Yao et al. |
| 6,118,248 A | 9/2000 | Gartstein et al. |
| 6,146,715 A | 11/2000 | Kim et al. |
| 6,148,503 A | 11/2000 | Delnick et al. |
| 6,168,884 B1 | 1/2001 | Neudecker et al. |
| 6,197,450 B1 | 3/2001 | Nathan et al. |
| 6,217,623 B1 | 4/2001 | Reichert et al. |
| 6,218,049 B1 | 4/2001 | Bates et al. |
| 6,220,765 B1 | 4/2001 | Tatoh |
| 6,227,204 B1 | 5/2001 | Baumann et al. |
| 6,238,847 B1 | 5/2001 | Axtell, III et al. |
| 6,242,129 B1 | 6/2001 | Johnson |
| 6,264,709 B1 | 7/2001 | Yoon et al. |
| 6,280,875 B1 | 8/2001 | Kwak et al. |
| 6,287,711 B1 | 9/2001 | Nieh et al. |
| 6,340,880 B1 | 1/2002 | Higashijima et al. |
| 6,365,010 B1 | 4/2002 | Hollars |
| 6,379,835 B1 | 4/2002 | Kucherovsky et al. |
| 6,387,039 B1 | 5/2002 | Moses |
| 6,387,563 B1 | 5/2002 | Bates |
| 6,398,824 B1 | 6/2002 | Johnson |
| 6,402,796 B1 | 6/2002 | Johnson |
| 6,411,780 B1 | 6/2002 | Maruyama |
| 6,413,645 B1 | 7/2002 | Graff et al. |
| 6,461,757 B1 | 10/2002 | Sasayama et al. |
| 6,472,295 B1 | 10/2002 | Morris et al. |
| 6,517,968 B2 | 2/2003 | Johnson |
| 6,558,836 B1 | 5/2003 | Whitacre et al. |
| 6,632,563 B1 | 10/2003 | Krasnov et al. |
| 6,636,017 B2 | 10/2003 | Zink et al. |
| 6,645,658 B2 | 11/2003 | Morozumi |
| 6,658,124 B1 | 12/2003 | Meadows |
| 6,661,197 B2 | 12/2003 | Zink et al. |
| 6,696,199 B2 | 2/2004 | Yoshida et al. |
| 6,700,766 B2 | 3/2004 | Sato |
| 6,713,987 B2 | 3/2004 | Krasnov et al. |
| 6,805,998 B2 | 10/2004 | Jenson et al. |
| 6,863,699 B1 | 3/2005 | Krasnov et al. |
| 6,866,901 B2 | 3/2005 | Burrows et al. |
| 6,916,679 B2 | 7/2005 | Snyder et al. |
| 6,921,464 B2 | 7/2005 | Krasnov et al. |
| 6,940,988 B1 | 9/2005 | Shennib et al. |
| 6,982,132 B1 | 1/2006 | Goldner et al. |
| 7,037,621 B2 | 5/2006 | Kikuchi et al. |
| 7,056,620 B2 | 6/2006 | Krasnov et al. |
| 7,122,908 B2 | 10/2006 | Jiang et al. |
| 7,157,187 B2 | 1/2007 | Jenson |
| 7,186,479 B2 | 3/2007 | Krasnov et al. |
| 7,194,801 B2 | 3/2007 | Jenson et al. |
| 7,194,901 B2 | 3/2007 | Silverbrook et al. |
| 7,276,878 B2 | 10/2007 | Phillips et al. |
| 7,286,479 B2 | 10/2007 | Bragg |
| 7,308,316 B2 | 12/2007 | Schommer |
| 7,359,590 B2 | 4/2008 | Hsu |
| 7,397,118 B2 | 7/2008 | Tominaga |
| 7,510,582 B2 | 3/2009 | Krasnov et al. |
| 7,524,577 B2 | 4/2009 | Bates |
| 7,701,176 B2 | 4/2010 | Chen |
| 7,846,579 B2 | 12/2010 | Krasnov et al. |
| 7,862,627 B2 | 1/2011 | Li et al. |
| 7,862,927 B2 | 1/2011 | Krasnov et al. |
| 8,030,898 B2 | 10/2011 | Okuto |
| 8,168,322 B2 | 5/2012 | Krasnov et al. |
| 8,728,176 B2 | 5/2014 | Li et al. |
| 8,870,974 B2 | 10/2014 | Nieh et al. |
| 2001/0007335 A1 | 7/2001 | Tuttle et al. |
| 2001/0041294 A1 | 11/2001 | Chu et al. |
| 2001/0052645 A1 | 12/2001 | Op'T Eynde et al. |
| 2002/0001746 A1 | 1/2002 | Jaenson |
| 2002/0004167 A1 | 1/2002 | Jenson et al. |
| 2002/0028384 A1 | 3/2002 | Krasnov et al. |
| 2002/0041930 A1 | 4/2002 | Erdemir et al. |
| 2002/0071989 A1 | 6/2002 | Verma et al. |
| 2002/0100989 A1 | 8/2002 | Jiang et al. |
| 2002/0102400 A1 | 8/2002 | Gorokhovsky et al. |

(56) References Cited

U.S. PATENT DOCUMENTS

| | | |
|---|---|---|
| 2002/0110733 A1 | 8/2002 | Johnson |
| 2002/0150823 A1 | 10/2002 | Breitkopf et al. |
| 2003/0121142 A1 | 7/2003 | Kikuchi et al. |
| 2003/0143460 A1 | 7/2003 | Yoshida et al. |
| 2003/0152829 A1 | 8/2003 | Zhang et al. |
| 2003/0160589 A1 | 8/2003 | Krasnov et al. |
| 2004/0018424 A1 | 1/2004 | Zhang et al. |
| 2004/0064937 A1 | 4/2004 | Krasnov et al. |
| 2004/0086762 A1 | 5/2004 | Maeda et al. |
| 2004/0175609 A1 | 9/2004 | Yageta et al. |
| 2005/0079418 A1 | 4/2005 | Kelley et al. |
| 2005/0112461 A1 | 5/2005 | Amine et al. |
| 2005/0130032 A1 | 6/2005 | Krasnov et al. |
| 2005/0147877 A1 | 7/2005 | Tarnowski et al. |
| 2005/0156573 A1 | 7/2005 | Lin |
| 2005/0275370 A1 | 12/2005 | Kim |
| 2006/0027937 A1 | 2/2006 | Benson et al. |
| 2006/0040169 A1 | 2/2006 | Liu et al. |
| 2006/0040170 A1 | 2/2006 | Liu et al. |
| 2006/0060956 A1 | 3/2006 | Tanikella |
| 2006/0068258 A1 | 3/2006 | Kinoshita |
| 2006/0115706 A1 | 6/2006 | Maeda et al. |
| 2006/0134522 A1 | 6/2006 | Zhang et al. |
| 2006/0152196 A1 | 7/2006 | Matsumoto et al. |
| 2006/0216589 A1 | 9/2006 | Krasnov et al. |
| 2006/0226812 A1 | 10/2006 | Patino et al. |
| 2006/0267546 A1 | 11/2006 | Shen et al. |
| 2006/0278617 A1 | 12/2006 | Anantharaman et al. |
| 2007/0000688 A1 | 1/2007 | Mobley |
| 2007/0037054 A1 | 2/2007 | Kikuchi et al. |
| 2007/0047750 A1 | 3/2007 | Sauer et al. |
| 2007/0047796 A1 | 3/2007 | Anantharaman et al. |
| 2007/0104343 A1 | 5/2007 | Bengtsson et al. |
| 2007/0104344 A1 | 5/2007 | Goldberg |
| 2007/0141460 A1 | 6/2007 | You et al. |
| 2007/0166612 A1 | 7/2007 | Krasnov et al. |
| 2007/0172739 A1 | 7/2007 | Visco et al. |
| 2007/0200258 A1 | 8/2007 | Mahler et al. |
| 2007/0297108 A1 | 12/2007 | Collins et al. |
| 2008/0003492 A1 | 1/2008 | Bates |
| 2008/0087986 A1 | 4/2008 | Tanikella |
| 2008/0191342 A1 | 8/2008 | Otremba |
| 2008/0213664 A1 | 9/2008 | Krasnov et al. |
| 2008/0217162 A1 | 9/2008 | Delrue et al. |
| 2008/0253098 A1 | 10/2008 | Liu |
| 2008/0263855 A1 | 10/2008 | Li et al. |
| 2008/0290363 A1 | 11/2008 | Lin et al. |
| 2008/0303056 A1 | 12/2008 | Ward et al. |
| 2008/0308935 A1 | 12/2008 | Kim et al. |
| 2009/0010462 A1 | 1/2009 | Ekchian et al. |
| 2009/0029500 A1 | 1/2009 | Wan |
| 2009/0039498 A1 | 2/2009 | Bayerer |
| 2009/0057136 A1 | 3/2009 | Wang et al. |
| 2009/0114429 A1 | 5/2009 | Sri-Jayantha et al. |
| 2009/0115051 A1 | 5/2009 | Leung et al. |
| 2009/0136839 A1 | 5/2009 | Krasnov et al. |
| 2009/0208671 A1 | 8/2009 | Nieh et al. |
| 2010/0028767 A1 | 2/2010 | Inose et al. |
| 2010/0247987 A1 | 9/2010 | Holung et al. |
| 2010/0291431 A1 | 11/2010 | Shih et al. |
| 2011/0050159 A1 | 3/2011 | Nieh et al. |
| 2011/0076550 A1 | 3/2011 | Liang et al. |
| 2011/0076567 A1 | 3/2011 | Bouillon |
| 2011/0094094 A1 | 4/2011 | Li et al. |
| 2011/0270477 A1 | 11/2011 | Ueki |
| 2012/0003520 A1 | 1/2012 | Lee et al. |
| 2012/0034502 A1 | 2/2012 | Nieh et al. |
| 2012/0080940 A1 | 4/2012 | Larsen |
| 2012/0251867 A1 | 10/2012 | Krasnov et al. |
| 2012/0268057 A1 | 10/2012 | Wu |

FOREIGN PATENT DOCUMENTS

| | | |
|---|---|---|
| EP | 0 829 913 A | 3/1998 |
| EP | 0933827 A1 | 8/1999 |
| EP | 1 353 429 A | 10/2003 |
| EP | 1 458 037 A | 9/2004 |
| FR | 2 403 652 A | 4/1979 |
| GB | 2251119 A | 6/1992 |
| JP | 59-032023 A | 2/1984 |
| JP | 59-226472 A | 12/1984 |
| JP | 60-072168 | 4/1985 |
| JP | 61-195563 A | 8/1986 |
| JP | 61195563 A | 8/1986 |
| JP | 04-295015 | 10/1992 |
| JP | 09-259929 A | 10/1997 |
| JP | H09-293516 A | 11/1997 |
| JP | 2001-044073 A | 2/2001 |
| JP | 2002-165358 | 6/2002 |
| JP | 2002-313289 | 10/2002 |
| JP | 2003-249199 A | 9/2003 |
| JP | 2009-123516 A1 | 6/2009 |
| WO | WO-95/14311 A | 5/1995 |
| WO | WO-98/08672 A1 | 3/1998 |
| WO | WO-99/23714 | 5/1999 |
| WO | WO-99/52589 A1 | 10/1999 |
| WO | WO-00/60689 A | 10/2000 |
| WO | WO-01/73873 A | 10/2001 |
| WO | WO-02/061828 A2 | 8/2002 |
| WO | WO-02/21627 A3 | 1/2003 |
| WO | WO-02/42516 A3 | 1/2003 |
| WO | WO-03/061049 A | 7/2003 |
| WO | WO-03/073531 A3 | 12/2003 |
| WO | WO-03/005477 A3 | 12/2004 |
| WO | WO-2004/111659 A2 | 12/2004 |
| WO | WO-2006/042357 A1 | 4/2006 |
| WO | WO-2006/105188 A1 | 10/2006 |
| WO | WO-2006/105050 A3 | 3/2007 |
| WO | WO-2007/042394 | 4/2007 |
| WO | WO-2008/004851 A1 | 1/2008 |
| WO | WO-2008/108999 A3 | 11/2008 |
| WO | WO-2008/134053 A1 | 11/2008 |
| WO | WO-2009/052683 A1 | 4/2009 |
| WO | WO-2009/073150 | 6/2009 |
| WO | WO 2011-066518 A1 | 6/2011 |

OTHER PUBLICATIONS

U.S. Appl. No. 12/894,571, BPAI Decision Dec. 18, 2013.
U.S. Appl. No. 12/894,571, Notice of Allowance Jan. 6, 2014.
U.S. Appl. No. 11/796,487, Notice of Allowance, Sep. 10, 2010.
U.S. Appl. No. 12/032,997, Corrected Notice of Allowance, Sep. 2, 2014.
U.S. Appl. No. 12/032,997, Final Office Action May 27, 2009.
U.S. Appl. No. 12/032,997, Final Office Action Jul. 15, 2010.
U.S. Appl. No. 12/032,997, Final Office Action Nov. 13, 2010.
U.S. Appl. No. 12/032,997, Office Action Jan. 15, 2013.
U.S. Appl. No. 12/032,997, Office Action Dec. 23, 2009.
U.S. Appl. No. 12/032,997, Office Action Nov. 11, 2008.
U.S. Appl. No. 12/894,571, Office Action Mar. 2, 2011.
PCT/US2008/005462, Int'l Report on Patentability Jul. 28, 2008.
PCT/US2013/034487, Int'l Report on Patentability Jul. 10, 2013.
Antaya et al. "Preparation and Characterization of LiCoO2 Thin Films by Laser Ablation Deposition", J. Electrochem. Soc., vol. 140, No. 3, Mar. 1993, pp. 575-578.
Fragnaud et al. "Characterization of sprayed and sputter deposited LiCoO2 thin films for rechargeable microbatteries", J. Power Sources, 63 (1996), pp. 187-191.
Birke et al. "Materials for lithium thin-film batteries for application in silicon technology", Solid State Ionics, 93 (1997), pp. 1-15.
Benqlilou-Moudden et al. "Amorphous Lithium Cobalt and Nickel Oxides Thin Films Preparation and Characterization by RBS and PIGE", Thin Solid Films 333 (1998), pp. 16-19.
PCT International Search Report in Application No. PCT/US2008/013213 (WO 2009/073150 A1), mailed Jun. 18, 2009.
Mattox, Donald M., Handbook of Physical Vapor Deposition (PVD) Processing, Film Formation, Adhesion, Surface Preparation and

(56) References Cited

OTHER PUBLICATIONS

Contamination Control, 1998, pp. 127-135 and 343-364, Noyes Publications, Westwood, New Jersey, USA.

Roh et al., "Effects of deposition condition on the ionic conductivity . . ." Scripta Materialia, Dec. 17, 1999, pp. 43-49, vol. 42. No. 1, New York, NY.

Bolster et al., "Investigation of lithium intercalation metal oxides for thermalbatteries" Proceedings of the 34th Int'l Power Source Symposium, Jun. 25-28, 1990, pp. 136-140.

Yang et al., "Effect of annealing temperature on structure and electrochemical properties of LiCoO2 cathode thin films", Rare Metals, vol. 25, Dec. 2006, pp. 189-192.

Liang et al., U.S. Appl. No. 13/278,082, filed Oct. 20, 2011, for Thin Film Battery Packaging Formed by Localized Heating.

Nieh et al., U.S. Appl. No. 13/627,977, filed Sep. 26, 2012, for Plasma Deposition on a Partially Formed Battery Through a Mesh Screen.

Shih et al., U.S. Appl. No. 13/626,842, filed Sep. 25, 2012, for Solid State Battery Having Mismatched Cells.

Shih et al., U.S. Appl. No. 13/333,969, filed Dec. 21, 2011, for Laminated Lithium Battery.

Nieh et al., U.S. Appl. No. 13/337,031, filed Dec. 23, 2011, for Sputtering Lithium-Containing Material With Multiple Targets.

Shih et al., U.S. Appl. No. 13/652,416, filed Oct. 15, 2012, for Lithium Battery Having Low Leakage Anode.

PCT International Search Report in Application No. PCT/US2011/046674 dated Feb. 17, 2012.

Bates et al., "Preferred orientation of polycrystalline LiCoO2 films" J. of the Electrochemical Society (2000), pp. 59-70, Issue No. 147 (1).

Wagner et al., "Fabrication and Testing of thermoelectric thin film devices" 15th Int'l Conf. on Thermoelectrics, Mar. 26-29, 1996, pp. 269-273.

Neudecker et al., "Lithium-Free Thin-Film Battery . . ." Journal of the Electrochemical Society (2000), pp. 517-523, Issue No. 147 (2).

Park et al., "Characterization of tin oxide/LiMn2O4 thin-film cell," Journal of Power Sources, Jun. 2000, pp. 250-254, vol. 88, No. 2, Elsevier Science S.A.

PCT International Preliminary Report on Patentability, Application No. PCT/US2008/013213 (WO09/073150), Mailed Jun. 10, 2010.

PCT Search Report, PCT/US2013/034487, dated Jul. 10, 2013.

U.S. Appl. No. 13/278,082, Final Rejection, mailed on Feb. 13, 2014.

U.S. Appl. No. 13/278,082, Non-Final Rejection, mailed on Jul. 24, 2013.

LOCALIZED HEAT TREATMENT OF BATTERY COMPONENT FILMS

BACKGROUND

Embodiments of the present invention relate to thin film batteries and their fabrication and packaging.

Thin film batteries are used in applications that require a small battery with a high energy density such as, for example, portable electronics, medical devices and space systems. A typical thin film battery typically comprises a substrate having one or more battery component films which cooperate to store electrical charge and generate a voltage. The battery component films include an electrolyte sandwiched between electrodes. Some of the battery component films can be metal-containing films which are composed of elemental metal, metal oxide or other metal-containing compounds. For example, elemental metal films can be used as current collectors to receive or provide electrons, such as for example, cathode and anode current collectors. Metal oxide or metal-containing compounds are useful as battery component films such as the cathode or electrolyte. The battery component films are thinner than conventional batteries, for example, the films can have thicknesses of less than 1000 microns, or even less than 100 microns. This allows thin film batteries to have thicknesses which are much smaller than the thickness of conventional batteries. The battery component films are often formed by processes such as physical and chemical vapor deposition (PVD or CVD), oxidation, nitridation, and electroplating processes. These batteries can either be used individually or stacked together to provide more power or energy.

In the thin film fabrication processes, the battery component films are sometimes heat treated to anneal, re-crystallize, or reduce lattice defects from the deposited film. For example, elemental metal films are heat treated to reduce lattice defects and provide better conductivity. Metal oxide films are also sometimes heated in air to anneal and/or obtain better crystalline properties. As an example, a cathode comprising a metal oxide electrode, such as for example lithium cobalt oxide in a lithium thin film battery, provides better electrical properties when annealed in oxygen-containing environment at temperatures ranging from 300 to 700° C. It is believed that the electrical characteristics of the annealed cathode is related to its oxygen content in its crystallographic structure, and when annealed, the cathode can allow the battery capacity to reach as high as its theoretical value for a given thickness and area. Still further, the lithium oxide cathode film can be deposited as an amorphous or microcrystalline film or as a stack of sequentially deposited thin amorphous films to form a thicker cathode, and thereafter, crystallized by heating the amorphous film or stack of films. Increasing the thickness of a lithium oxide cathode film increases the energy density of the battery as the thicker cathode film provides greater charge retention and faster charging and discharging, as for example, taught in commonly assigned U.S. patent application Ser. No. 11/007,362 entitled "THIN FILM BATTERY AND METHOD OF MANUFACTURE" which is incorporated by reference herein in its entirety.

However, the heat treatment process needed for a battery component film is often conducted after the deposition of underlying battery component films, and can result in thermal degradation or even oxidation of the underlying films. For example, in lithium batteries, a cathode current collector of elemental metal is often deposited below a cathode of metal oxide. Heat treatment of the overlying metal oxide cathode can result in oxidation of the underlying elemental metal of the current collector. For example, current collectors made from metals such as aluminum or copper can form an oxidized thin film layer of aluminum oxide or copper oxide, respectively, which increases the electrical resistance at the interface of the current collector and the overlying anode or cathode electrode to reduce overall battery efficiency.

To prevent or reduce the effects of thermal or oxidation degradation, noble metals such as platinum or gold, are often used as the current collectors. However, these metals are expensive and can substantially increase the cost of the resultant battery. In addition, metals such as platinum often exhibit poor adhesion to the underlying substrate requiring deposition of an adhesion layer between the substrate and platinum to prevent the metal from peeling. The additional deposition steps required for forming the adhesion layers further increase processing time and cost.

For reasons including these and other deficiencies, and despite the development of various battery structures, and deposition and heat treatment processes for thin film batteries, further improvements in battery structures and heat treatment methods are continuously being sought.

SUMMARY

A battery fabrication method comprises forming on a substrate, at least a portion of a battery cell comprising a plurality of battery component films that include an underlying film with an overlying metal-containing film. A beam incident area on the metal-containing film is locally heated by directing onto the metal-containing film, an energy beam maintained at a fluence of at least about 800 J/cm$^2$, wherein the metal-containing film is heated to a temperature that is at least 100° C. higher than the temperature attained by the underlying film.

In another version, the battery fabrication method comprises forming on a substrate, at least a portion of a battery cell comprising an elemental electrode and a metal oxide electrode. An energy beam is directed onto the metal oxide electrode, the energy beam being maintained at a sufficiently low power level to heat a beam incident area on the metal oxide electrode to a temperature of at least 400° C.

In still another version, the heat treatment method comprises forming on a substrate, an elemental metal electrode and an overlying metal oxide electrode. An energy beam is selected such that the energy beam has at least one of the following characteristics: (i) a linear attenuation coefficient in the metal oxide electrode of at least about $5 \times 10^{-4}$; and (ii) a reflection coefficient from the elemental metal electrode that is at least about 5%. The energy beam is directed onto the metal oxide electrode to heat treat the metal oxide electrode.

A lithium battery comprises a support and a cathode current collector on the support. The cathode current collector comprises an elemental metal comprising at least one of molybdenum, tantalum or tungsten. A cathode is on the cathode current collector. An electrolyte is on the cathode. One or more of an anode and anode current collector, is on the electrolyte.

DRAWINGS

These features, aspects, and advantages of the present invention will become better understood with regard to the following description, appended claims, and accompanying drawings, which illustrate examples of the invention. However, it is to be understood that each of the features shown in the drawings can be used in the invention in general, not merely in the context of the particular drawings, and the invention includes any combination of these features, where:

DESCRIPTION

Figure 1A:
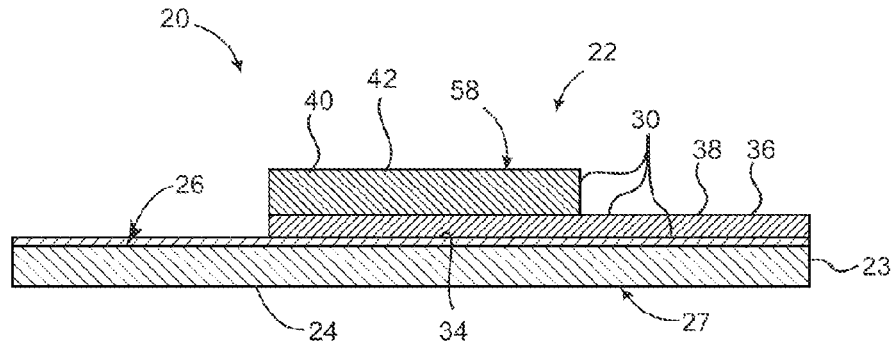
FIG. 1A is a sectional side view of an exemplary embodiment of a partially fabricated battery cell on a substrate, the battery cell comprising battery component films that include metal-containing films such as an elemental metal electrode and an overlying metal oxide electrode.

An exemplary embodiment of a method of fabricating a thin film battery 20 comprising a battery cell 22 on a substrate 24 will be illustrated with reference to FIGS. 1A-1C and 2. The substrate 24 selected for the battery 20 comprises a material that has low permeability to environmental gases or vapor such as water vapor, oxygen, carbon monoxide or carbon dioxide. The substrate 24 should also have a relatively smooth surface and good mechanical strength. For example, the substrate 24 can comprise aluminum, aluminum oxide, metal foil, metalized plastic film, mica, quartz, or steel. In one version, the substrate 24 comprises a plate 23 having top and bottom surfaces 26, 27 which are planar and smooth. While exemplary embodiments of a thin film battery 20 and process of manufacture are described, it should be understood that other battery structures and fabrication processes can also be used as would be apparent to one of ordinary skill in the art. For example, the fabrication process described herein can include processes of forming a battery cell 22 which are found in commonly assigned U.S. patent application Ser. No. 12/032,997, entitled "THIN FILM BATTERY FABRICATION USING LASER SHAPING" to Nieh et al., filed on Feb. 18, 2008; as well as U.S. Pat. No. 6,921,464; U.S. Pat. No. 6,632,563, U.S. Pat. No. 6,863,699, and U.S. Pat. No. 7,186,479; all of which are incorporated by reference herein and in their entireties.

Figure 2:
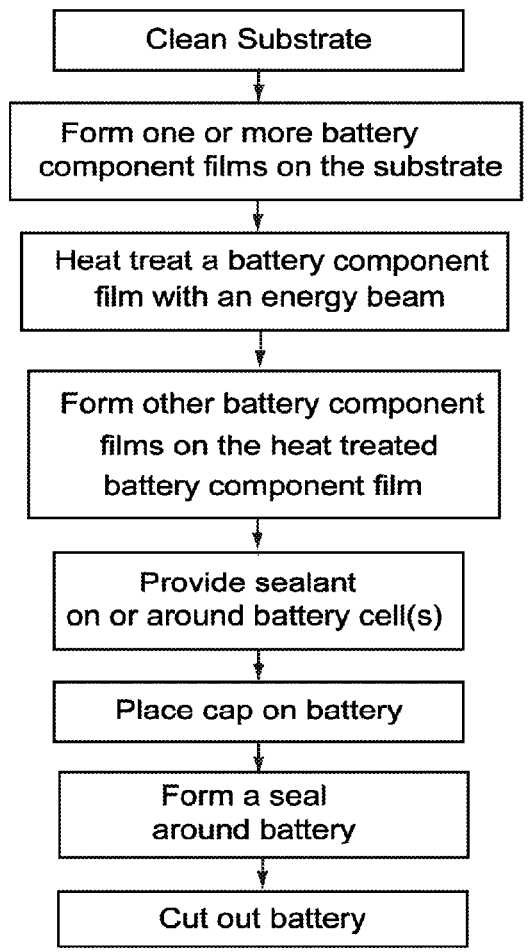
FIG. 2 is a flowchart illustrating an exemplary process for fabricating the battery including the step of heat treating a battery component film of the battery cell.

Referring to FIG. 2, the top and bottom surfaces 26, 27 of the substrate 24 are cleaned to remove surface contaminants to obtain good adherence of deposited films. For example, the substrate 24 can be cleaned by an annealing process in which the substrate is heated to temperatures sufficiently high to clean the surface by burning off contaminants and impurities, such as organic materials, water, dust, and other materials deposited on the surfaces 26, 27. The substrate 24 can also be heated to temperatures sufficiently high to remove any water of crystallization that maybe present in the substrate material. The annealing temperatures and/or water of crystallization removal temperatures can be, for example, from about 150 to about 600° C., or even at least about 540° C. The annealing process can be conducted in an oxygen-containing gas, such as oxygen or air, or other gas environments, for about 10 to about 120 minutes, for example, about 60 minutes.

After a clean top surface 26 is obtained, one or more battery component films 30, which can be metal-containing films or non-metallic films, are deposited on the surface 26 of the substrate 24 to form at least a portion of a battery cell 22 of a battery 20. For example, FIG. 1C shows an exemplary version of a completed battery 20 having one battery cell 22. The battery cell 22 has terminals 25a,b connected to a set of battery component films 30 that cooperate to store and generate electrical energy. In one exemplary embodiment, the battery component films 30 of the battery cell 20 can include, for example, any one of a set of terminals 25a,b, an adhesion layer 34, one or more elemental metal electrodes 36 such as a cathode current collector 38 or an anode current collector 50, a metal oxide electrode 40 such as for example a cathode 42, an electrolyte 44, and other electrode layers such as an anode 48, all of which are shown in FIG. 1C. The type or number of battery component films 30, sequence of deposition of these films on the substrate 24, heat treatment of particular films 30 and not others, and number and location of the battery cells 22, can be changed as would be apparent to those of ordinary skill in the art. Thus, the scope of the claims should not be limited to the exemplary embodiments described herein.

In the exemplary version shown, a battery component film that is an adhesion layer 34 is deposited on the top surface 26 of the clean substrate 24, as shown in FIG. 1A, to improve adhesion of overlying battery component films 30. In this example, the substrate 24 is a mica sheet. However, an adhesion layer 34 may not be needed depending on the selected type of substrate 24. The adhesion layer 34 can comprise a metal or metal compound, such as for example, aluminum, cobalt, titanium, other metals, or their alloys or compounds thereof; or a ceramic oxide such as, for example, lithium cobalt oxide. When the adhesion layer 34 is fabricated from titanium, the titanium film is deposited in a sputtering chamber with, for example, the following sputtering process conditions: sputtering gas comprising argon at a pressure of from about 1 mTorr to 20 mTorr; DC (direct current) sputtering plasma at a power level of from about 500 W to about 5 kW, deposition time of about 10 to 60 seconds, titanium target size of 5×20 inches, and target to substrate distance of from about 10 to about 20 cm. The adhesion layer 34 is deposited to a thickness of from about 100 to about 1500 angstroms. To form batteries 20 on both sides of the substrate, a second adhesion layer (not shown) is deposited on the planar bottom surface 27, and one or more second battery cells (also not shown) are formed on the bottom surface 27.

A battery component film 30 comprising a first metal-containing film, which in this version is an elemental metal electrode 36 is formed on the adhesion layer 34. Depending on the material of the substrate 24, the first metal-containing film 32 can also be formed directly on the substrate 24. The elemental metal electrode 36 can serve as a current collector, for example, a cathode current collector 38 to collect electrons during battery charging and discharging processes. The elemental metal electrode 36 can be a first metal-containing film 32 that is composed of a metal in its elemental form, such as for example, aluminum, platinum, silver or gold. The elemental metal electrode 36 can also comprise the same metal as the adhesion layer 34 which is deposited in a thickness that is sufficiently high to provide the desired electrical conductivity. A suitable thickness for the elemental metal electrode 36 is from about 0.05 microns to about 2 microns.

In one version, the elemental metal electrode 36 comprises platinum in a thickness of about 0.2 microns. The elemental metal electrode 36 can be formed by deposition of a metal such as platinum by DC magnetron sputtering. The sputtering conditions for depositing a platinum film from a platinum target uses a sputtering target composed of platinum; sputtering gas comprising argon at a gas pressure of from about 1 mTorr to about 50 mTorr, for example about 5 mTorr; a DC plasma formed from electrodes maintained at a power level of from about 10 to about 400 W, for example about 40 W; and a deposition time of from about 1 to about 20 minutes. An elemental metal electrode 36 of platinum can have a thickness of about 0.2 microns.

It has been discovered that the elemental metal electrode 36 that can serve as a cathode current collector 38, can be composed of at least one of chromium, molybdenum, tantalum or tungsten. These materials were selected to serve as a cathode current collector 38 as they can provide better resistance to thermal degradation when overlying battery component films 30 are heat treated. For example, all of these materials have a melting point that exceeds 1000° C. which provides enhanced heat resistance. The higher melting point improves the resistance to oxidation when the cathode current collector 38 is heated in an oxygen-gas containing environment. Still further, a cathode current collector 38 of chromium, molybdenum, tantalum or tungsten provides better adhesion and lower thermal expansion than that of a noble metal.

As one example, a cathode current collector 38 made from molybdenum has a lower resistivity than platinum, and a high melting point of 2623° C. Molybdenum also burns only at temperatures above 600° C. Molybdenum does not visibly react with oxygen or water at room temperature, and the bulk oxidation occurs only at temperatures above about 790° C. In addition to the excellent resistance to oxidation, a cathode current collector 38 of molybdenum exhibits good adhesion to a substrate 24 that is a mica sheet. Tantalum and tungsten have even higher melting points at 3290K and 3695K respectively. Tantalum and Tungsten can also provide a higher Young's Modulus.

The improvement of cathode current collectors 38 of chromium, molybdenum, tantalum or tungsten, over traditional cathode current collectors 38 made from platinum, is demonstrated from adhesion data which is obtained after heat treatment of an overlying battery component film 30. For example, it was found by tape peeling tests, that a cathode current collector 38 composed of at least one of chromium, molybdenum, tantalum or tungsten, has much better adhesion than a cathode current collector 38 made from platinum. Still further, use of a cathode current collector 38 of chromium, molybdenum, tantalum or tungsten avoids the use of platinum and its associated high cost. In addition, a cathode current collector 38 of chromium, molybdenum, tantalum or tungsten was also found to have superior adhesion to a variety of different kinds of substrate materials, including mica, even without use of an adhesion layer 34. Thus when cathode current collectors 38 of chromium, molybdenum, tantalum or tungsten are used, the adhesion layer 34 is optional and these cathode current collectors 38 can be deposited directly onto the substrate 24 reducing processing time and associated costs.

Suitable sputtering conditions for depositing an elemental metal electrode 36 comprise selecting a sputtering target composed of the metal to be deposited and mounting the target in a sputtering chamber (not shown); introducing a sputtering gas, such as for example argon, into a sputtering chamber at a flow rate of from about 1 to about 20 sccm and maintaining a sputtering gas pressure of from about 1 mTorr to about 10 Torr; and forming a plasma from the sputtering gas by charging electrodes in the sputtering chamber at a power level of from about 10 W to about 5 KW for from about 1 to 10 minutes.

Figure 1B:
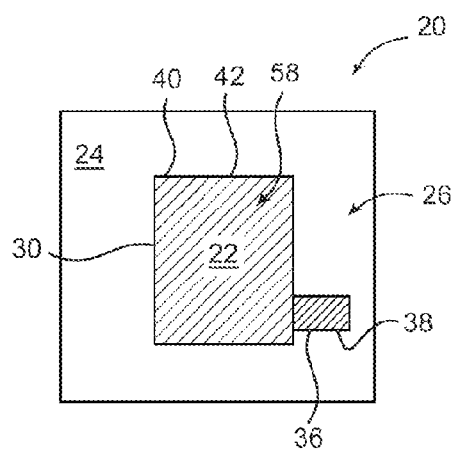
FIG. 1B is a top plan view of the partially fabricated battery cell of FIG. 1A.
Figure 1C:
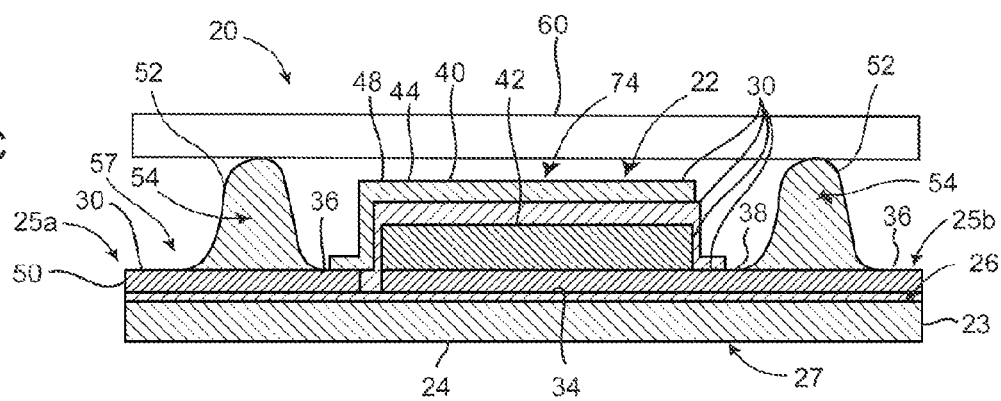
FIG. 1C is a sectional side view of the completed battery of FIG. 1A.

In the version shown, a battery component film 30 that is a second metal-containing film 46 is formed over an underlying film, such as the first metal-containing film 32. In one version, the second metal-containing film 46 comprises a metal oxide electrode 40, and is formed over a first metal-containing film 32 that is the elemental metal electrode 36, to obtain a partially fabricated battery cell 22 as shown in FIGS. 1A and 1B. The metal oxide electrode 40 comprises a metallic oxide or a mixture of metal oxides, and serves as a second metal-containing film 46 that is formed over the first-metal containing film. In one version, the metal oxide electrode 40 is an electrochemically active material that can serve as a cathode 42. For lithium batteries, a metal oxide electrode 40 that can serve as a cathode 42 can be composed of lithium metal oxide, such as for example, lithium cobalt oxide, lithium nickel oxide, lithium manganese oxide, lithium iron oxide, or even lithium oxides comprising mixtures of transition metals such as for example, lithium cobalt nickel oxide. Other types of metal oxide electrodes 40 that can serve as a cathode 42 include amorphous vanadium pentoxide or crystalline $V_2O_5$. The metal oxide electrode 40 can be deposited as a single film or as a stack of films, with alternate deposition and annealing steps. In one version, the metal oxide electrode 40 comprises a layer deposited conformal to the profile of the underlying elemental metal electrode 36, with a thickness of at least about 5 microns, or even at least about 10 microns.

Suitable sputtering conditions for depositing the second metal-containing film 46 that is a metal oxide electrode 40, comprise selecting a sputtering target composed of the metal of the metal oxide to be deposited and mounting the target in a sputtering chamber (not shown); introducing a sputtering gas, such as for example a oxygen-containing gas and/or argon, into a sputtering chamber at a flow rate of from about 50 to about 300 sccm; maintaining a sputtering gas pressure of from about 1 mTorr to about 10 Torr; and forming a plasma from the sputtering gas by charging electrodes in the sputtering chamber with an AC or DC current at a power level of from about 10 W to about 5 KW for from about 1 to 10 minutes. In another method, a metal oxide electrode 40 can be deposited by selecting a sputtering target composed of the desired metal oxide material to be deposited and mounting the target in a sputtering chamber (not shown); introducing a sputtering gas, such as for example argon, into a sputtering chamber at a flow rate of from about 50 to about 300 sccm; maintaining a sputtering gas pressure of from about 1 mTorr to about 10 Torr; and forming a plasma from the sputtering gas by charging electrodes in the sputtering chamber with an alternating current (AC) or radio-frequency (RF) plasma sputtering at a power level of from about 10 W to about 5 KW for from about 1 to 10 minutes. For example, a metal oxide electrode 40 composed of lithium cobalt oxide can be formed by alternating current (AC) or radio-frequency (RF) plasma sputtering at a frequency of from about 40 k Hz of a target comprising lithium and cobalt in a reactive gas environment, for example oxygen gas, introduced into the chamber at a flow rate of from about 10 to about 100 sccm and maintained a pressure of from about 1 mTorr to about 15 m Torr, or by other conventional methods.

Figure 3A:
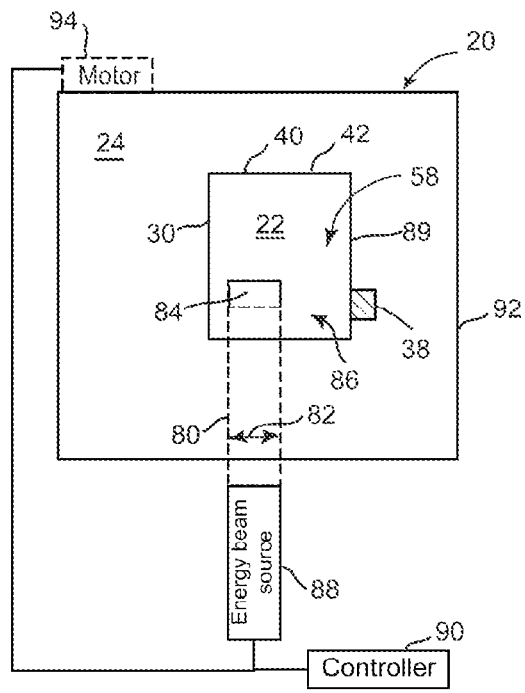
FIG. 3 is a schematic diagram of an energy beam heating the metal oxide electrode and being reflected from underlying elemental metal electrode.
Figure 3B:
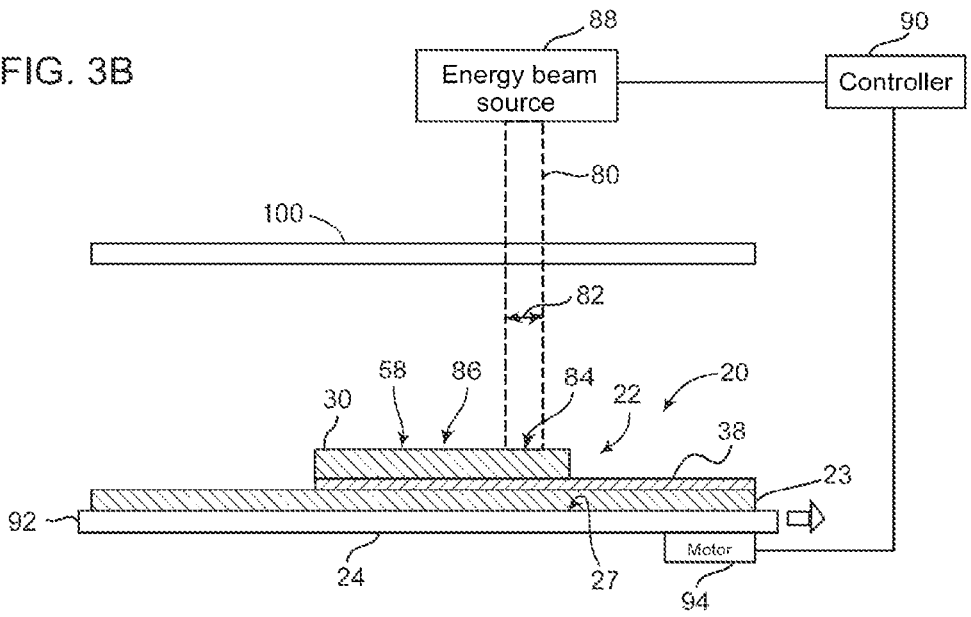

After deposition of one or more battery component films 30, an overlying battery component film 30 is locally heat treated by directing an energy beam 80 onto a beam incident area 84 on a top surface 58 of the battery component film 30, as illustrated in FIGS. 3A and 3B. In the exemplary illustration, the second metal-containing film 46 overlying the first metal-containing film 32 is heat treated. The second metal-containing film 46 is a metal oxide electrode 40, such as for example, a cathode 42. The energy beam 80 provides localized heating of a beam incident area 84 of the second metal-containing film 46 comprising the metal oxide electrode 40 without excessively heating adjacent regions 86 or the underlying first metal-containing film 32.

The energy beam 80 locally heats the overlying second metal-containing film 46 without excessively heating the underlying metal-containing film. In one version, a beam incident area on the metal-containing film is locally heated by directing onto the metal-containing film, an energy beam maintained at a fluence of at least about 10 J/cm². The energy beam heats the metal-containing film to a temperature that is at least 100° C. higher than the temperature attained by the underlying film. The fluence of the energy beam 80 is the radiation flux integrated over time, and is a measure of the energy delivered per unit area in units of J/m². It is the total energy that intersects a unit beam incident area in a specific time interval. For example, for an energy beam 80 of electromagnetic radiation, such as a pulsed laser beam, which has a pulse peak power, pulse duration, and a beam incident area 84 comprising a focal spot area, the fluence can be calculated as follows:

Fluence (J/m²)=laser pulse energy (J)/focal spot area;

where the laser pulse energy (J)=peak power (W)/pulse duration (s).

For example, a suitable fluence for an energy beam 80 to heat the second metal-containing film 46 to a temperature which is at least 100° C. higher than the temperature attained by the first metal-containing film 32 while the energy beam is incident on the overlying second metal-containing film 46, is at least about 10 J/cm², or even at least about 200 J/cm², or even from about 50 to about 100 J/cm². These levels of fluence were found to heat the second metal-containing film 46 to a temperature of at least 400° C., or even a temperature of from about 400 to about 700° C., while the peak temperature simultaneously attained by the first metal-containing film 32 during the local heating process is maintained at less than 300° C. In this version, the underlying first metal-containing film 32 is heated to temperatures of less than 300° C. to avoid excessive heating of the underlying film to heat treat the metal oxide electrode 40 substantially without thermally degrading or oxidizing the underlying elemental metal electrode 36. The fluence of the energy beam 80 is selected by setting a power level and scanning speed of the energy beam 80, as described below.

In one version, the energy beam 80 is selected to have heating properties that selectively heat the upper or overlying battery component film 30 without excessively heating the underlying battery component film 30. For example, the energy beam 80 can be selected to have a linear attenuation coefficient in the overlying battery component film 30, which can be a metal-containing film such as the metal oxide electrode 40, of at least about 5×10⁻⁴. The measured intensity I of an energy beam 80 transmitted through a battery component film 30 having a thickness x is related to the incident intensity $I_0$ according to the inverse exponential power law that is usually referred to as Beer-Lambert law $I=I_0 e^{-\alpha x}$ where x denotes the path length of the energy beam 80 through the film thickness. The linear attenuation coefficient, α, describes the extent to which the intensity of the energy beam 80 is reduced as it passes through the thickness of the overlying battery component film 30, or in this case, the second metal-containing film 46. By selecting an energy beam 80 which has the desired linear attenuation coefficient in an overlying battery component film 30, the amount of energy transferred to the underlying battery component film 30, such as the first metal-containing film 32, is reduced to less than about 10% or even less than about 5%. This prevents heat build up in the underlying film, and consequently, allows the underlying film to remain at lower temperatures.

In still another version, the energy beam 80 is selected to have a Half Value Layer (also half-value thickness) in the overlying battery component film 30 of at least about 1 microns. The Half Value Layer is the thickness of the battery component film 30, or in this case the second metal-containing film 46, which reduces the intensity of radiation entering the material by half. By selecting an energy beam 80 which has a particular Half Value Layer in the overlying battery component film 30, the amount of energy transferred to the underlying battery component film 30, which is also the first metal-containing film 32, is reduced to less than 50% or even less than 10%. This further prevents heat build up in the underlying film, and consequently, allows the underlying film to remain at lower temperatures while the overlying film is being heated.

In yet another version, the energy beam 80 comprises an electromagnetic beam, and is selected to have a reflection coefficient from the underlying film of at least about 5×10⁻⁴. The reflection coefficient is the ratio of the amplitude of the reflected wave from the underlying battery component film 30 to the amplitude of the incident wave that reaches the interface at the underlying battery component film 30 after traveling through the overlying battery component film 30. For example, when the underlying battery component film is the first metal-containing film 32 and the overlying battery component film 30 is the second metal-containing film 46, then the reflection coefficient is the ratio of the amplitude of the reflected wave from the underlying metal-containing film to the amplitude of the incident wave that reaches the interface of the first and second metal-containing films 32, 46. The larger the reflection coefficient, the less radiation incident on the underlying film is absorbed by the underlying film to increase its temperature. Thus, it is desirable for the underlying film to have a high reflection coefficient to reduce the temperature of this film during heat treatment, and consequently, reduce thermal degradation of the film.

The energy beam 80 also has a beam width 82 selected in size to cover and heat a beam incident area 84 on the battery component film 30, which can be the second metal-containing film 46 or metal oxide electrode 40, without excessively heating adjacent regions 86 or adjacent battery component films. In one example, the energy beam 80 has a beam width 82 that is sized less than about 2000 microns, for example, from about 100 to about 1000 microns. In contrast to conventional heat treatment techniques in which the entire partially fabricated battery cell 22 is heated up in an oven, the localized heat treatment of a battery component film 30 with an energy beam 80 having a controlled beam width size and power level allows heating of a single overlying battery component film 30 without excessively heating adjacent regions 86 or underlying battery component films 30.

The localized heat treatment process can have diverse applications depending on the nature of the battery component film 30. For example, it is believed that the heat treatment process using the localized energy of the energy beam 80 anneals a battery component film 30 to reduce stresses, reduce the number of lattice defects, and/or even alter the crystallographic properties of the film. For example, a suitable heat treatment can induce changes in both crystal size and crystallographic preferred orientation in metal-containing films. As an example, when a metal-containing film comprising a metal oxide electrode 40 is heat treated, the heat treatment increases the electrical conductivity of the metal-containing oxide film by altering its crystallographic properties to improve the electrical properties of the electrode 40. It is particularly desirable to heat treat a metal oxide electrode 40 that serves as a cathode 42, when the cathode 42 is a thick layer deposited in a sequence of deposition process steps to build up the thickness of the cathode 42. The thicker cathode 42 has a thickness of at least about 4 microns, and serves to provide better cathode efficiency.

Still further, when a selected energy beam 80 such as a $CO_2$ laser beam is scanned across a cathode 42 at room temperature, the metal oxide material of the metal oxide electrode 40 has a higher absorbance rate of the $CO_2$ laser beam than the underlying elemental metal material of the elemental metal electrode 38. While the metal oxide cathode absorbs more than 90% of the incident energy of the $CO_2$ laser beam to heat up this layer, the underlying elemental metal layer nearly totally reflects the $CO_2$ laser beam without substantially changing temperature. The localized temperature increase in the overlying metal oxide layer transfers some heat to the underlying elemental oxide layer, but the underlying metal layer is isolated from the ambient environment by the overlying metal oxide layer and thus protected from oxidation for small temperature rises, and the pulse of transferred heat is localized and short, further limiting heat build-up. The localized heating of the overlying metal oxide layer 40 thus does not substantially increase the temperature of the underlying layer nor cause oxidation of the underlying metal.

As another example, the heat treatment process using localized energy of the energy beam 80 can also be used to heat treat a metal-containing film such as an elemental metal electrode 36, for example the cathode current collector 38 or anode current collector 50. Similarly, the anode current collector 50 can also be heat treated after deposition of this film. For example, a cathode or anode current collector 38, 50 comprising platinum can be heat treated to improve its crystalline properties. As one example, the energy beam 80 can be maintained at a sufficiently low power level to heat the beam incident area 84 on the elemental metal electrode 36 to a temperature of at least about 200° C., or even a temperature of at least about 400° C. Other battery component films 30 can also be heat treated using the energy beam 80, as would be apparent to those of ordinary skill in the art, and heat treatment of these films are included in the scope of the present application.

In the localized heat treatment process, an energy beam source 88 generates an energy beam 80 that is raster scanned across an entire top surface 58 of the battery component film 30 in a pattern that matches the shape and profile of the battery component film 30. In the example shown, the energy beam 80 is shown as being scanned across a battery component film 30 comprising a metal-containing film that is a metal oxide electrode 40, such as a cathode 42. However, the energy beam 80 can be scanned or otherwise moved across any of the battery component films 30 described herein, especially metal-containing films which can improve in electrical properties with heat treatment, or other battery component films 30 as would be apparent to those of ordinary skill in the art, using the same apparatus and methods of operation.

During scanning, the energy beam 80 can be manually operated or controlled by a controller 90 which controls the power applied to the energy beam source 88 and the motion of a movable stage 92 capable of moving the battery 20 during localized heating by the energy beam 80. The movable stage 92 can be a table that can be moved in the x and y directions by a stage motor 94 controlled by the controller 90. The movable stage 92 and controller 90 can include interpolative program code to enable movement of the table in the x-y plane using velocity or even acceleration vectors. In one embodiment, the movable stage 92 can be set to provide different vectorial velocities, for example from about 0.1 to about 400 mm/s, or even from 2 mm/sec to about 10 mm/sec. In another embodiment, the vectorial acceleration of the stage can be set with levels ranging from about 0.5 to about 50 mm/sec$^2$, for example, at 0.8, 4, 20, and 40 mm/sec$^2$. In one version, the movable stage 92 is capable of being positioned to an accuracy of greater than about 12 microns. A low power laser (not shown) can also be used to indicate the position of the energy beam 80 on the battery 20, such as for example, a He—Ne laser. The heating and scanning process can be carried out by either moving the energy beam or sample stage. The energy beam localized heating process can be conducted in a chamber, such as a dry box or even a clean room or dry room.

In still another process version, while a battery component film 30 such as a metal-containing film, for example a metal oxide electrode 40, is locally heated by the energy beam 80, a gaseous environment is maintained about the battery component film 30 to promote heat treatment. For example, an oxygen-containing gas can be maintained about a metal-containing film, such as a metal oxide electrode 40, for example the cathode 42, during heat treatment of this film. The oxygen-containing gas assists in reducing any lattice or other defects present in the as-deposited metal oxide electrode 40 or cathode 42. For example, the oxygen-containing gas can result in the film having a post heat treatment stoichiometric composition that is closer to ideal by causing oxygen diffusion into the metal oxide electrode 40. Still further, the oxygen-containing gas can also increase the oxygen content in the annealed crystallographic structure of the metal oxide electrode 40 which improves the electrical characteristics of the electrode. However optimal annealing temperatures of from about 400 to about 750° C. can cause a thin oxide layer to form on metals other than noble metals at the annealing conditions, and bulk oxidation at higher temperatures. Thus annealing the metal oxide electrode 40 can increase the internal resistance of the battery cell 22 due to formation of a thin oxide layer in the oxygen-containing ambient atmosphere. The localized heating using the energy beam 80 avoids or entirely eliminates oxidation of the underlying layer.

A suitable oxygen-containing gas comprises oxygen, air, or other oxygen-containing gases. In one version, a suitable flow rate of the oxygen-containing gas, such as air or oxygen is introduced into a chamber, while the energy beam 80 is directed onto the battery component film 30, such as the metal-containing film which is a metal oxide electrode 40. For example, an oxygen-containing gas comprising oxygen can be introduced into the chamber (not shown) at a suitable flow rate. In still another version, a gas nozzle 93 is used to blow a gas stream 95 of an oxygen-containing gas onto the localized heating area 84 of the metal oxide electrode 40 during heat treatment, as for example, shown in FIG. 4. In still another version, air can be maintained at atmospheric pressure about the metal oxide electrode 40 to create an oxygen-containing environment about the metal oxide electrode 40 during heat treatment (not shown).

In one version, the energy beam 80 comprises a laser beam 101 generated by an energy beam source 88 that is a laser beam source 103. The laser beam source 103 is selected to generate the laser beam 101 at a sufficiently high power level to heat up the battery component film 30 when incident thereon without damaging underlying films 30. A suitable laser beam source 103 can generate a laser beam 101 having a wavelength in the ultra-violet (UV), visible, infrared (IR) or partial IR ranges, such as a range of from about 0.2 to about 50 microns. The laser beam source 103 can provide a laser beam 101 that is continuous or pulsed. In the continuous beam version, the laser beam source 103 generates a continuous laser output having a steady state equilibrium. An exemplary laser beam source 103 comprises a carbon dioxide laser. An exemplary embodiment of a carbon dioxide laser provides a laser beam 101 having a wavelength of from about from about 1 to about 100 microns, or even from about 10 microns to about 11 microns. A suitable carbon dioxide laser comprises a CB0805-30 available from Han's laser, Newberg, Oreg. 97132, USA. A continuous laser beam can also be generated by an ultraviolet laser providing a laser beam 101 having a wavelength of from about 100 to about 400 nm. An exemplary ultraviolet laser comprises a Hawk-II available from Quantronix, East Setauket, N.Y.

The laser beam source 103 can also generate a laser beam 101 that is a pulsed beam. In this version, the laser beam source 103 generates a laser beam 101 comprising pulsed laser bursts which have an output energy having a series of energy spikes that may be partially overlapping or entirely separated in time. For example, in one embodiment, a laser beam source 103 is programmed to provide laser beam bursts of ultraviolet light at a power level of from about 0.2 to about 1 watts, and with a duration of from about 40 to about 160 nanoseconds. These pulsed bursts can be provided at a pulse rate of from about 5 to about 200 Hz. The pulsed laser bursts can be moved across the battery substrate with a vectorial velocity of from about 0.1 to about 10 mm/s.

In another example, an energy beam comprising femtosecond pulsed laser beam 101 was set to provide an irradiance level of from about 10 to about 200 J/cm2, and pulsed laser bursts having a pulse duration of from about 10 to about 1000 femtoseconds, for example, about 150 femtosecond. Based on this pulse duration, the fluence level of the femtosecond pulsed laser beam 101 was calculated to be from about 10 to about 200 J/cm2. The pulse can be set to be from about 100 microjoules to about 2000 millijoules, in one example, about 500 microjoules. The pulse repetition rate should also be set to provide good cutting, and in one example, the pulse repetition rate was set to be from about 50 to about 1000 Hz, for example, about 125 Hz.

Figure 4:
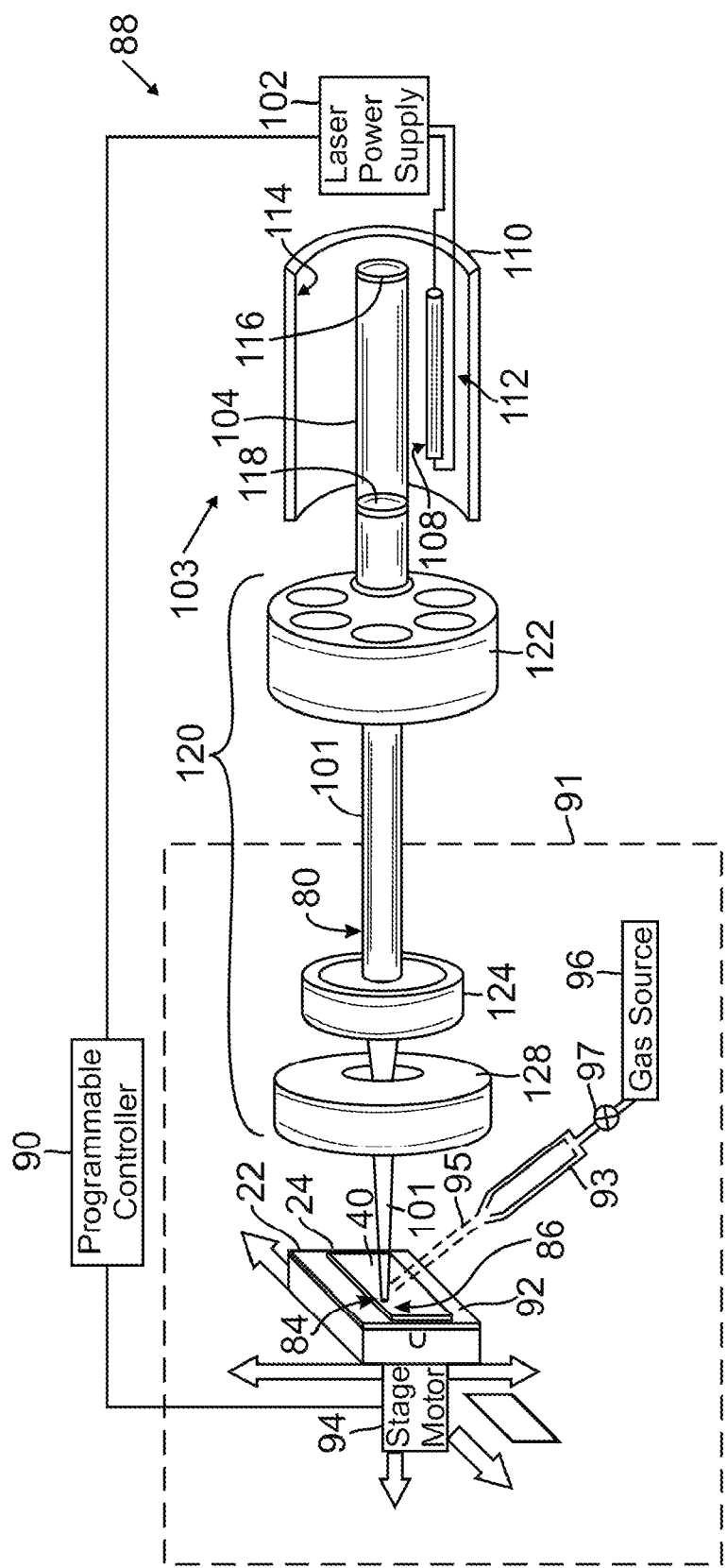
FIG. 4 is a schematic diagram of an embodiment of a laser beam apparatus capable of locally heating the battery component film.

A schematic diagram of an embodiment of an energy beam source 88 comprising a laser beam source 103 capable of locally heating a battery component film 30 of a battery cell 22 is illustrated with reference to FIG. 4. The laser beam source 103 is positioned above a movable stage 92 and is powered by a laser power supply 102 to generate a laser beam 101 that is directed onto the battery component film 30 of the battery 20 to locally heat a beam incident area 84. An exemplary laser beam source 103 that can provide pulsed laser bursts comprises a lasing medium 104 and laser light source 108 positioned at the twin focal points of a light resonator 110. The lasing medium 104 can be a solid-state rod material such as a titanium doped sapphire, Nd:YAG, a chromium ion doped ruby; or a gas laser which uses a combination of an inert gas and reactive gas to generate the laser beam 101. The light resonator 110 comprises an elliptical cavity 112 having reflective surfaces 114 which reflect photons emitted from the light source toward the lasing medium 104. These photons resonate in the lasing medium 104 between a highly reflective mirror 116 and a partially reflective output coupler 118 at either end of the lasing medium 104. The generated laser beam 101 is emitted through the partially reflective output coupler 118. The composition and concentration of the lasing medium 104, and the construction of the elliptical cavity 112 of the light resonator 110, mirror 116, and coupler 118, are optimized for continuous or pulsed laser operation.

An exemplary version of the laser beam source 103 is a carbon dioxide laser operated at a power level of about 30 watts in a continuous laser beam mode (not pulse). The laser beam 101 is directed onto the battery component film 30 of a battery cell 22 on a substrate 24 which is placed on a movable stage 92 comprising a table that can be moved in the x and y directions by a stage motor 94 that is a synchronous or step motor. The stage motor 94 can operate in a grill or cellular system to provide a scanning speed of from about 0.1 to about 300 mm/sec across the substrate 24 and with a repeat accuracy of about ±0.03 mm. The controller 90 operating the motor 98 of the movable stage 92, can be for example, a WIN2000 industrial computer with program code to enable movement of the stage 92 in the x-y plane using velocity or even acceleration vectors. The apparatus has a 6 inch diameter vent and uses an air cooler for cooling. The apparatus operates with a power requirement of about 1.5 KW.

The continuous laser beam 101 generated by the laser beam source 103 is passed through a laser optical system 120 which comprises a neutral density filter 122, one or more focusing lenses 124, and a shutter 128. The neutral density filter 122 reduces the intensity of all wavelengths or colors equally. The focusing lens 124 can have a focal length of from about 1 cm to about 20 cm, such as for example, 10 cm. In the continuous laser beam mode, the shutter 128 is either not present or, if present, the shutter 128 kept open to allow the laser beam 101 to pass through the open shutter without interruption. In the pulse laser beam mode, the shutter 128 is operated to rapidly open or close. By opening and closing rapidly, the shutter 128 can generate a laser beam 101 having laser pulses with pulse durations in nanoseconds or femtoseconds. The shutter 128 can be a mechanical shutter, mode locking shutter, or electro-optical shutter.

A gas nozzle 93 can also be used to blow a gas stream 95 of a blowing gas onto the localized beam incident area 84 on the battery component film 30 to remove any debris or vapors from the localized heating area. The gas nozzle 93 obtains the blowing gas from a gas source 96 and the gas flow rate or pressure can be controlled by a gas flow controller 97. The blowing gas can be air, argon, nitrogen, or a mixture of such gases, and the pressure of the gas can be, for example, at least 2 $Kg/cm^3$. In one version, the blowing gas comprises an oxygen-containing gas such as oxygen or air, to maintain an oxygen-containing environment around the metal oxide electrode 40 being heat treated.

Figure 5:
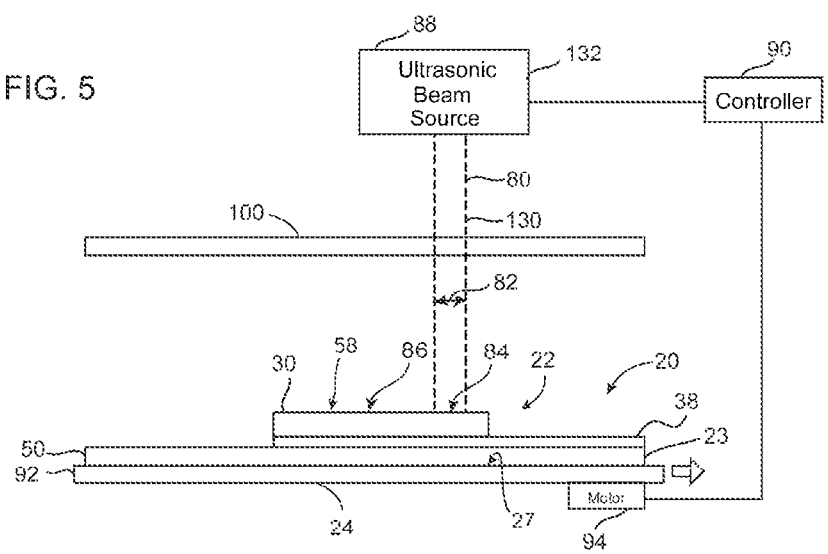
FIG. 5 is a schematic diagram of an embodiment of an ultrasonic beam apparatus capable of locally heating the battery component film.

In another version, the energy beam 80 comprises an ultrasonic energy beam 130 generated by an energy beam source 88 that is an ultrasonic beam source 132, as shown in FIG. 5. The ultrasonic beam source 132 is selected to generate the ultrasonic energy beam 130 at a sufficiently high power level to heat treat the battery component film 30 when incident thereon. A suitable ultrasonic beam source 132 capable of generating an energy beam 80 is an ultrasonic energy beam 130 having a frequency of from about 1 KHz to about 100 MHz. A suitable ultrasonic beam source 132 is 2000X Ultrasonic Assembly System available from Branson Ultrasonics Corporation. These ultrasonic apparatus can operate at a frequency of 20 kHz with a power output rating of 1250, 2500, and 4000 Watts; at a frequency of 30 kHz with a power output rating 750 and 1500 Watts; and at a frequency of 40 kHz with a power output rating of 400 and 800 Watts. There is no warm-up time and no need for constant temperature maintenance.

Figure 6:
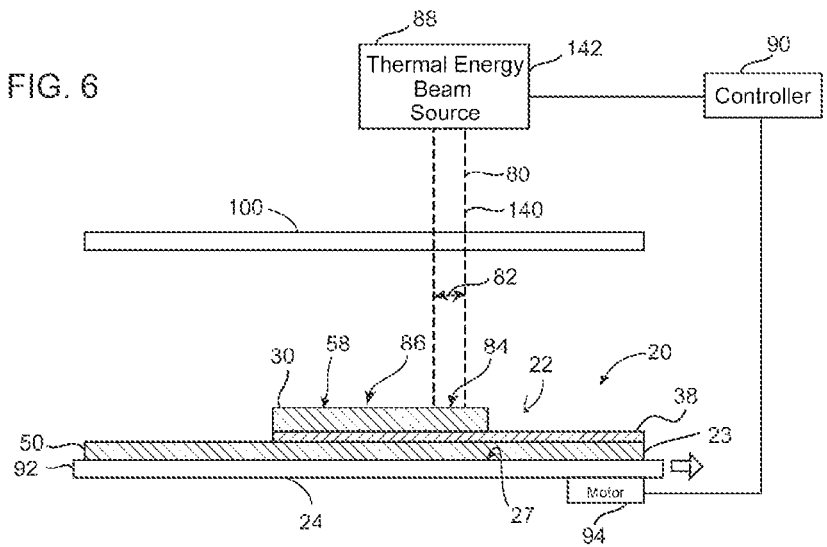
FIG. 6 is a schematic diagram of an embodiment of a thermal energy beam apparatus capable of locally heating the battery component film.

In yet another version, the energy beam 80 comprises a thermal energy beam 140 generated by an energy beam source 88 that is a thermal energy beam source 142, as shown in FIG. 6. The thermal energy beam source 142 is selected to generate the thermal energy beam at a sufficiently high power level to heat the battery component film 30 when incident thereon. A suitable thermal energy beam source 142 and generate a thermal energy beam 140 having a thermal energy flux of from about 0.1 to about 5 J/mm$^2$. A suitable thermal energy source 142 comprises a point thermal sealer linear thermal sealer, micro halogen light system, and micro blowtorch. The thermal energy beam 140 also provides localized heating of the beam incident area 84 without heating adjacent regions 86.

After heat treatment of the metal oxide electrode 40, an electrolyte 44 is deposited over the metal oxide electrode 40. For lithium batteries, the electrolyte 44 can be, for example, an amorphous lithium phosphorus oxynitride film, also known as a LiPON film. In one embodiment, the deposited LiPON material has the stoichiometric form $Li_xPO_yN_z$ in an x:y:z ratio of about 2.9:3.3:0.46. In one version, the electrolyte 44 has a thickness of from about 0.1 microns to about 5 microns. This thickness is suitably large to provide sufficiently high ionic conductivity and suitably small to reduce ionic pathways to minimize electrical resistance and reduce stress. The electrolyte 44 can be formed by RF sputtering of target material comprising lithium and phosphorous in a reactive gas environment, for example oxygen gas.

Another elemental metal electrode 36 is then formed on the electrolyte 44. The second elemental metal electrode 36 can serve, for example, as an anode current collector 50. The second elemental metal electrode 36 can be made from the same material as the first elemental metal electrode 36, as already described. A suitable thickness of a second elemental metal electrode 36 is from about 0.1 microns to about 20 microns. In one version, the second elemental metal electrode 36 is made from lithium which is sufficiently conductive to serve as the anode current collector 50, and in this version, the anode 48 and anode current collector 50 are made of the same material.

In still another version, an elemental metal electrode 36 that serves as an anode current collector 50 is deposited onto the electrolyte 44. In this version, the anode current collector 50 is made from the same material as the cathode current collector 38 to provide a conducting surface from which electrons can be dissipated or collected from the anode 48. For example, in one version, the anode current collector 50 comprises a non-reactive metal such as silver, gold, platinum, in a thickness of from about 0.05 microns to about 5 microns. The non-reactive metal can be deposited by conventional sputtering or PVD methods or by electroplating. The elemental metal electrode 36 comprising an anode current collector 50 can also be heat treated after deposition, using the energy beam 80, as described herein.

An anode 48 is then deposited directly onto the electrolyte 44. The anode 48 can be connected to an anode current collector 50 by depositing an anode current collector 50 onto the anode 48, or can be connected to an anode current 50 collector by depositing an anode current collector 50 and then depositing the anode onto the electrolyte 44 and over a portion of the anode current collector 50. For lithium batteries, an anode 48 composed of lithium can be formed by either thermal evaporation or sputtering of target material comprising lithium.

The battery cell 22 comprising a plurality of battery component films 30, and/or the substrate 24, can also be shaped to form shaped features, for example, by removing portions of the battery component films 30. The shaping processes can be performed before or after all the battery component films 30 are deposited on the substrate 24, and before or after any of the heat treatment processes. For example after deposition of the metal oxide electrode 40 comprising a cathode 42 and the electrolyte 44, a shaping process can be used to shape one or both of these films, such as by etching away the edge portion or forming holes for any of the terminals 25a,b which are shown in FIG. 10. Suitable shaping processes include pulsed laser, etching, another such processes, and are used to form the shapes of the battery component films 30.

After fabrication of one or more battery cells 22 on the substrate 24 to form a battery 20, a sealant 52 is applied to extend across at least one, a plurality of, or even substantially the entire length of (or all of) the open peripheral side surfaces 54 along a perimeter 56 of battery 20, as shown in FIG. 10. The perimeter 56 of the battery confines the battery cells 22 therein, and the open peripheral side surfaces 54 are those surfaces which are vertical relative to the planar top surface 26 of the substrate 24 and extend around the perimeter 56. It should be understood that while the sealant 52 is shown as extending around the perimeter 56 of a battery 20 comprising a single battery cell 22, the sealant 52 can enclose individual battery cells 22 or a plurality of battery cells 22 of a multi-cell battery 20. The sealant 52 can also extend to cover an exposed battery top surface 74. In both versions, the sealant 52 is applied to a thickness of less than 60 microns, for example, from about 20 to about 50 microns. In the version shown a portion of the cathode current collector 38 and part of the anode current collector 50 extend outside of the sealant enclosed area to serve as the terminals 25a,b, respectively, for connecting the battery 20 to the external environment. A suitable sealant 52 can be composed of a thermoplastic or thermoset polymer, epoxy, or other materials.

After the sealant 52 is in place, a cap 60 is aligned over the battery top surface 74, as shown in FIG. 10. The sealant 52 serves as a sidewall 98 that joins the substrate 24 to the cap 60, and pressure can be applied to the cap 60 or substrate 24 to more securely bond the sealant 52 to the substrate 24 and cap 60. In one version, the cap 60 is made from the same material as the substrate 24. For example, the substrate 24 is made of a plate 23 composed of aluminum, mica or steel, the cap 60 can also be made from the same material. However, the substrate 24 and the cap 60 can also be made from different materials, including quartz, metal foil, ceramic, and metal/polymer combinations such as metalized plastic film, or combinations of these materials. The cap 60 can be shaped and sized so that the cathode current collector 38 and the anode current collector 50 extend out of the covered area to be exposed as the terminals 25a,b. Further, when placing the cap 60 over the battery 20, a gap can be maintained between the cap 60 and the battery top surface 74 of the battery cell 22 as shown in FIG. 10. The gap distance can be for example, less than 100 microns, or even from about 10 microns to about 50 microns. The cap 60 can have a thickness of less than 50 microns, for example, from about 7 to about 40 microns.

After fabrication, one or more batteries 20 each comprising a single battery cell 22 or multiple battery cells 22 are cut out of the substrate 24. A suitable cutting process can include laser cutting using the previously described laser apparatus set to a higher power level, or by mechanical cutting. Prior to cutting, protective shadow masks (not shown) comprising a plate or polymer can also be used to protect portions of the battery films 30 from subsequent cutting processes. Laser cutting can also be performed using a pulsed laser process, such as a femtosecond laser comprising a diode-pumped solid-state laser with a lasing medium comprising a rod of titanium doped sapphire. In another exemplary embodiment, the pulsed laser source is be an ultraviolet laser such as an excimer or 'excited dimer' laser, which is a chemical laser that uses a combination of an inert gas, such as argon, krypton, or xenon; and a reactive gas such as fluorine or chlorine. Several exemplary laser source and cutting methods are described in co-pending U.S. patent application Ser. No. 11/796,487 to Li et al. and co-pending U.S. patent application Ser. No. 12/032,997 to Nieh et al., both of which are incorporated by reference herein and in their entireties.

Examples

The following examples illustrate annealing effect of heat treating a battery component film 30 such as a first metal-containing film 32 comprising a metal oxide electrode 40 deposited over another underlying battery component film that is a second metal-containing film 46, such as an elemental metal electrode 36. The examples described herein are illustrative of embodiments of the present battery structure and fabrication method but should not be used to limit the scope of the claims.

Table I shows test results comparing the performance of batteries 20 having battery component films 30 that were heat treated using localized energy by an energy beam 80 that is a $CO_2$ laser beam, with other batteries comprising control battery component films (designated "as-deposited") which were not heat treated. Both groups of batteries 20 each comprised a single battery cell 22 with the same internal battery component films 30, structure, and film thicknesses. The energy capacity of heat treated and control batteries were measured by discharging the selected battery at a current of 1 mA from a voltage of 4.2 V to a voltage of 3.6 V.

The results from Table I demonstrate that the energy capacity of batteries 20 that contained battery component films 30 which were heat treated such as a metal oxide electrode 40 that served as a cathode 42, overlying an elemental metal electrode 36 comprising a cathode current collector 38, was significantly greater than those of control as-deposited batteries. The number EFF represents the efficiency of the cathode 42 which is calculated by dividing the tested capacity by a theoretical maximum capacity value. It is seen that the EFF value for the localized heat treated batteries significantly changed the EFF to 61% from the as-deposited values of 30%.

While illustrative embodiments of the thin film battery 20 are described in the present application, it should be understood that other embodiments are also possible. For example, the locally heating method can be performed by other directed energy sources, such as ultrasonic beam, micro blowtorch, and rapid thermal annealing, as would be apparent to those of ordinary skill in the art. Further, the exemplary methods of fabricating the batteries described herein are provided only to illustrate the present invention, and other methods may be used to fabricate a battery 20 as would be apparent to those of ordinary skill in the art. Furthermore, the materials of the battery components films 30 are also exemplary and may comprise other materials. Also, the battery 20 may have a plurality of battery cells 22 arranged in a convoluted or non-symmetrical shape depending on the application. Thus the scope of the claims should not be limited by the exemplary methods of manufacture, materials and structures provided herein.

What is claimed is:

1. A battery fabrication method comprising:
    (a) forming on a substrate, at least a portion of a battery cell comprising a plurality of battery component films that include an underlying film with an overlying metal-containing film;
    (b) selecting an electromagnetic radiation beam that has a reflection coefficient from the underlying film of at least about 5%; and
    (c) locally heating a beam incident area on the metal-containing film by directing onto the metal-containing film, the selected electromagnetic radiation beam maintained at a fluence of at least about 800 $J/cm^2$, wherein the metal-containing film is heated to a temperature that is at least 100° C. higher than the temperature attained by the underlying film.

2. A method according to claim 1 wherein the underlying film comprises a first metal-containing film and the overlying metal-containing film comprises a second metal-containing film, and wherein (c) comprises maintaining the fluence of the energy beam at a level that is sufficiently high to heat the second metal-containing film to a temperature of at least 400° C. while the maximum temperature simultaneously attained by the first metal-containing film during the local heating process is maintained at less than 300° C.

3. A method according to claim 1 wherein (b) comprises selecting an electromagnetic radiation beam comprising at least one of:
    a linear attenuation coefficient in the metal-containing film of at least about $5 \times 10^{-4}$; and
    (ii) a Half Value Layer in the metal-containing film of at least about 1 micron.

4. A method according to claim 1 wherein (b) comprises selecting an electromagnetic radiation beam having at least one of the following properties:

TABLE I

| Capacity of batteries with cathode approx. 4.2 micron thick | | | | | | | | |
|---|---|---|---|---|---|---|---|---|
| Capacity (microAh) | Capacity Sample 1 | EFF 1 | Capacity Sample 2 | EFF 2 | Capacity Sample 3 | EFF 3 | Capacity Sample 4 | EFF 4 |
| Laser annealed at power 6.7 W, speed 4 mm/s | 449 | 52.5% | 438 | 51.2% | | | | |
| Laser annealed at power 7 W, speed 4 mm/s | 522 | 61.1% | | | | | | |
| As-deposited | 284 | 33.2% | 224 | 26.2% | 254 | 29.7% | 258 | 30.2% |

Figure 7:
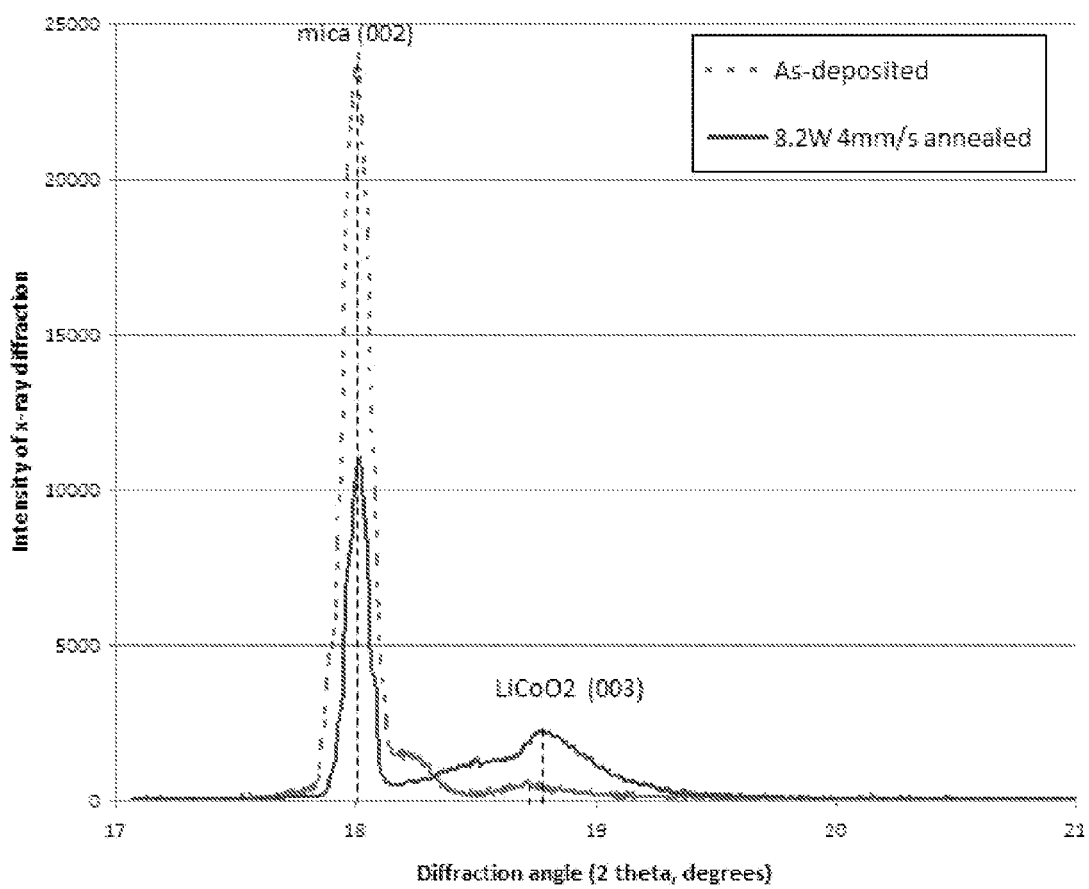
FIG. 7 is an X-ray diffraction graph showing the intensity of X-ray diffraction for increasing X-ray incident angle for a heat treated (annealed) and as deposited (no heat treatment) metal-containing film comprising a cathode film of $LiCoO_2$.

The results of tested capacity are consistent with x-ray diffraction data which indicated changes in the crystal structure of the cathode 42 after localized heat treatment with the $CO_2$ laser energy beam. As shown for example in FIG. 7, an X-ray diffraction plot for a laser heat treated layer (labeled 8.2 W 4 mm/s annealed to indicate heat treatment by a laser powered at 8.2 Watts and at a linear movement speed of 4 mm/s) shows evident crystallization as compared to the as-deposited layer. The crystallization is revealed by a shorter lattice parameter (larger diffraction angle) due to ordering structure after annealing and stronger relative intensity of diffracted peaks of $LiCoO_2$ crystal structure.

(i) a beam width of less than about 1000 microns;
(ii) that is a $CO_2$ laser beam; and
(iii) a wavelength of from about 1 to about 100 microns.

5. A method according to claim 1 wherein (c) comprises scanning the electromagnetic radiation beam across the metal-containing film.

6. A method according to claim 1 wherein the underlying film comprises an elemental metal electrode and the overlying metal-containing film comprises a metal oxide electrode.

7. A method according to claim 6 wherein the elemental metal electrode comprises at least one of molybdenum, platinum, tantalum or tungsten.

8. A method according to claim 6 wherein the metal oxide electrode comprises a lithium oxide material.

9. A method according to claim 6 wherein (c) comprises maintaining an oxygen-containing gas about the metal oxide electrode while directing the electromagnetic radiation beam onto the metal oxide electrode.

10. A battery fabrication method comprising:
(a) forming on a substrate, at least a portion of a battery cell comprising an elemental metal electrode and a metal oxide electrode;
(b) selecting an electromagnetic radiation beam having at least one of the following properties:
(i) a beam width of less than about 1000 microns;
(ii) that is a $CO_2$ laser beam; and
(iii) a wavelength of from about 1 to about 100 microns; and
(c) directing the electromagnetic radiation beam onto the metal oxide electrode, the electromagnetic radiation beam being maintained at a sufficiently low power level to heat a beam incident area on the metal oxide electrode to a temperature of at least 400° C.

11. A method according to claim 10 wherein (b) comprises selecting the electromagnetic radiation beam to have a linear attenuation coefficient in the metal oxide electrode of at least about $5 \times 10^{-4}$.

12. A method according to claim 10 wherein (b) comprises selecting the electromagnetic radiation beam to have a Half Value Layer in the metal oxide electrode of at least about 1 micron.

13. A method according to claim 10 wherein (b) comprises selecting the electromagnetic radiation beam such that the reflection coefficient of the electromagnetic radiation beam from the elemental metal electrode is at least about 5%.

14. A method according to claim 10 wherein (a) comprises forming an elemental metal electrode comprising at least one of chromium, molybdenum, tantalum or tungsten.

15. A method according to claim 10 wherein (a) comprises forming a metal oxide electrode comprising a lithium oxide material.

16. A method according to claim 10 wherein (c) comprises maintaining an oxygen-containing gas about the metal oxide electrode.

17. A heat treatment method comprising:
(a) forming on a substrate, at least a portion of a battery cell comprising a plurality of battery component films that include an elemental metal electrode and an overlying metal oxide electrode;
(b) selecting an electromagnetic radiation beam having at least one of the following characteristics:
(i) a linear attenuation coefficient in the metal oxide electrode of at least about $5 \times 10^{-4}$;
(ii) a reflection coefficient from the elemental metal electrode that is at least about 5%; and
(iii) a Half Value Layer in the metal oxide electrode of at least about 1 micron; and
(c) directing the electromagnetic radiation beam onto the metal oxide electrode to heat treat the metal oxide electrode.

18. A method according to claim 17 wherein the electromagnetic radiation beam is sized to cover a beam incident area on the metal oxide electrode, and wherein (c) comprises maintaining the electromagnetic radiation beam at a sufficiently low power level to heat the beam incident area on the metal oxide electrode to a temperature of at least about 400° C.

19. A method according to claim 17 wherein (c) further comprises maintaining an oxygen-containing gas about the metal oxide electrode of the battery cell.

20. A battery fabrication method comprising:
(a) forming on a substrate, at least a portion of a battery cell comprising a plurality of battery component films that include an underlying first metal-containing film and an overlying second metal-containing film;
(b) selecting an energy beam comprising at least one of:
(i) a linear attenuation coefficient in the second metal-containing film of at least about $5 \times 10^{-4}$; and
(ii) a Half Value Layer in the second metal-containing film of at least about 1 micron; and
(c) directing onto the second metal-containing film, the selected energy beam maintained at a fluence of at least about 800 $J/cm^2$ to locally heat a beam incident area on the second metal-containing film to a temperature that is (i) at least 400° C., and (ii) at least 100° C. higher than the temperature attained by the first metal-containing film.

21. A method according to claim 20 wherein (b) comprises selecting an energy beam comprising an electromagnetic radiation beam having a reflection coefficient from the first metal-containing film of at least about 5%.

22. A method according to claim 21 wherein (b) comprises selecting an electromagnetic radiation beam having at least one of the following properties:
(i) a beam width of less than about 1000 microns;
(ii) that is a $CO_2$ laser beam; and
(iii) a wavelength of from about 1 to about 100 microns.

23. A method according to claim 20 wherein the first metal-containing film comprises an elemental metal electrode and the second metal-containing film comprises a metal oxide electrode.

24. A method according to claim 23 wherein (i) the elemental metal electrode comprises at least one of molybdenum, platinum, tantalum or tungsten, and (ii) the metal oxide electrode comprises a lithium oxide material.

* * * * *